United States Patent
Teramura et al.

(10) Patent No.: US 9,887,986 B2
(45) Date of Patent: Feb. 6, 2018

(54) RELAY DEVICE, RELAY METHOD, AND PROGRAM

(71) Applicant: NOMURA RESEARCH INSTITUTE, LTD., Chiyoda-ku, Tokyo (JP)

(72) Inventors: Ryoichi Teramura, Tokyo (JP); Jun Hashimoto, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 14/651,912

(22) PCT Filed: Dec. 12, 2012

(86) PCT No.: PCT/JP2012/082159
§ 371 (c)(1),
(2) Date: Jun. 12, 2015

(87) PCT Pub. No.: WO2014/091576
PCT Pub. Date: Jun. 19, 2014

(65) Prior Publication Data
US 2015/0326557 A1    Nov. 12, 2015

(51) Int. Cl.
*H04L 29/00* (2006.01)
*H04L 29/06* (2006.01)
(Continued)

(52) U.S. Cl.
CPC ............ *H04L 63/083* (2013.01); *G06F 21/31* (2013.01); *H04L 9/32* (2013.01); *H04L 12/66* (2013.01);
(Continued)

(58) Field of Classification Search
CPC . H04L 9/32; H04L 63/02; H04L 63/08; H04L 63/10; G06F 21/03; G06F 21/04
See application file for complete search history.

(56) References Cited

U.S. PATENT DOCUMENTS

| 6,324,648 B1 * | 11/2001 | Grantges, Jr. .......... | H04L 63/02 709/229 |
| 7,958,347 B1 * | 6/2011 | Ferguson ................ | H04L 9/321 713/155 |

(Continued)

FOREIGN PATENT DOCUMENTS

JP    2012203624 A    10/2012

OTHER PUBLICATIONS

International Search Report corresponding to Application No. PCT/JP2012/082159; dated Feb. 12, 2013.

(Continued)

*Primary Examiner* — Madhuri Herzog
(74) *Attorney, Agent, or Firm* — Cantor Colburn LLP (57) ABSTRACT

Provided are a relay device capable of appropriate access management, a relay method, and a program. The relay device (10): receives a user ID and password for logging on to a server (a desired server) in a financial information system (41), a client information system (42), or an inventory management system (43), on the basis of a connection request from a work terminal (20) (client terminal); and relays a connection without performing user verification using the received user ID and password, when establishing a session with the desired server. The relay device connects to the server using processing that differs from the processing for relaying this connection, confirms the appropriateness of the received user ID and password combination, and establishes a session with the desired server if the user ID and password combination is confirmed to be correct.

5 Claims, 7 Drawing Sheets

(51) Int. Cl.
*H04L 25/20* (2006.01)
*H04L 12/66* (2006.01)
*H04L 9/32* (2006.01)
*G06F 21/31* (2013.01)

(52) U.S. Cl.
CPC .......... *H04L 25/20* (2013.01); *H04L 63/0281* (2013.01); *H04L 63/0209* (2013.01)

(56) References Cited

U.S. PATENT DOCUMENTS

| | | | |
|---|---|---|---|
| 2002/0157019 A1* | 10/2002 | Kadyk | H04L 63/0281 726/4 |
| 2006/0126603 A1* | 6/2006 | Shimizu | H04L 12/12 370/356 |
| 2006/0155721 A1* | 7/2006 | Grunwald | H04L 63/083 |
| 2010/0138534 A1* | 6/2010 | Mutnuru | H04L 43/0817 709/224 |
| 2011/0060902 A1 | 3/2011 | Nagata | |
| 2011/0258432 A1* | 10/2011 | Rao | H04L 63/08 713/150 |

OTHER PUBLICATIONS

Singapore Written Opinion for foreign counterpart SG application 11201504468W dated Jan. 11, 2017 in English translation.

\* cited by examiner

RELAY DEVICE, RELAY METHOD, AND PROGRAM

This is the U.S. national stage of application No. PCT/JP2012/082159, filed on Dec. 12, 2012, the disclosure of which is incorporated herein by reference.

TECHNICAL FIELD

The present invention relates to a relay device, a relay method, and a computer program.

BACKGROUND ART

A server constituting a business information system is to be accessed by means of not only an ID with a common authorization level but also an ID with a high authorization level to generate, update, erase or execute various kinds of data. Such an ID with an authorization, exceeding a common authorization level, is called "a privileged ID" and known as, for example, "root" in a UNIX system, "Administrator" in a Windows system, and "SYS" and "SYSTEM" in a DB system. There are many kind of privileged IDs in addition to the above described examples. Some of these IDs are to be shared with some operators or used in a computer program. In many cases, a privileged ID has to be used in a normal operation or a failure handling. Therefore, it is extremely difficult to specify the privileged ID user and execute appropriate access management for that user as compared to access management for a common authorization level ID user.

However, in a situation such as an IT control audit, it may be pointed out that it should be managed "when", "who", and "why" a server constituting a business information system is accessed, including by means of a privileged ID may be pointed out that, with respect to an operation by a privileged ID user, it cannot be specified who accessed the server or that, with respect to an operation to the server constituting the business information system, duties are not divided, anyone can conduct operations, operation logs cannot be acquired, and confirmation after operations did not be performed.

In order to deal with such points, for example, Patent Literature 1 discloses the technique of managing a privileged ID by authenticating a privileged ID user as follows: a user with a privileged ID is connected to a relay device before a server constituting a business information system and the relay device performs user authentication, whereby a registered user ID is associated with the privileged ID used in a connection destination server.

CITATION LIST

Patent Literature (PTL 1) JP 2012-203624 A

SUMMARY OF INVENTION

Technical Problem

However, the configuration disclosed in Patent Literature 1 has still room for improvement in strictly performing access management of a privileged ID. Examples of a conventional access to a server constituting a business information system and an access in which a problem occurs will be described with reference to the drawings.

Figure 5:
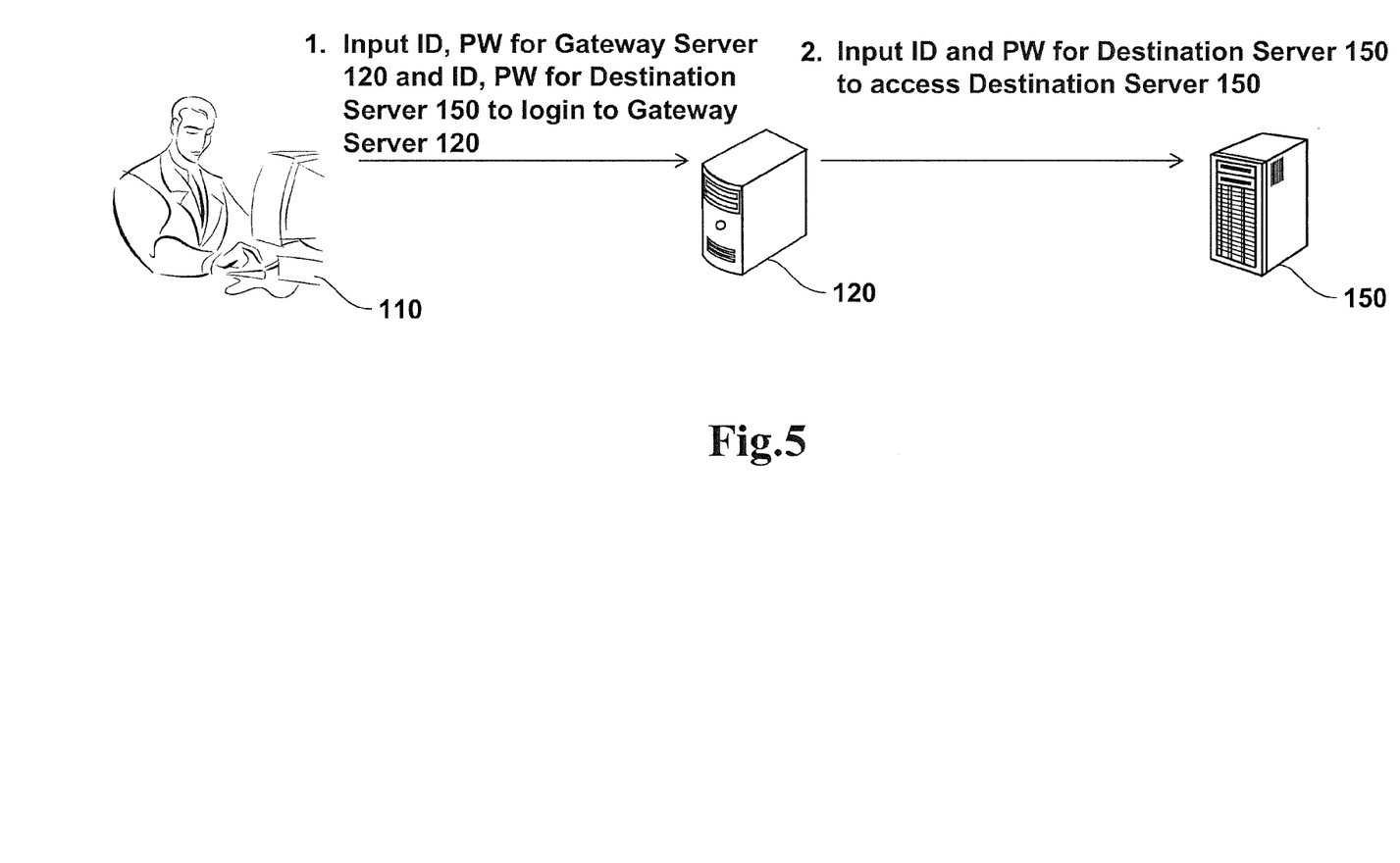
FIG. 5 is a diagram describing an example of a conventional access to a server constituting a business information system.

FIG. 5 is a diagram describing an example of a conventional access to a server constituting a business information system. First, a user who needs to access from an operation terminal 100 to a destination server 150 inputs a user ID and a password for a gateway server 120, which manages a privileged ID, and a user ID and a password for the destination server 150 to try to login to the gateway server 120. The gateway server 120 performs user authentication based on the user ID and the password managed in the gateway server 120. Furthermore, when the gateway server 120 confirms that the combination of the input user ID and password is correct and the combination is of the user ID having an authority for logging in to the destination server 150, the gateway server 120 transmits a connection request including the user ID and the password for the destination server 150 to the destination server 150. The destination server 150 performs user authentication based on the user ID and the password transmitted from the gateway server 120. When the combination of the user ID and the password is validated, login processing is automatically executed. Thus, the gateway server 120 can authenticate the privileged ID user. It will now be described an example in which the gateway server 120 fail to perform the access management to a destination server 150 constituting a business information system.

Figure 6:
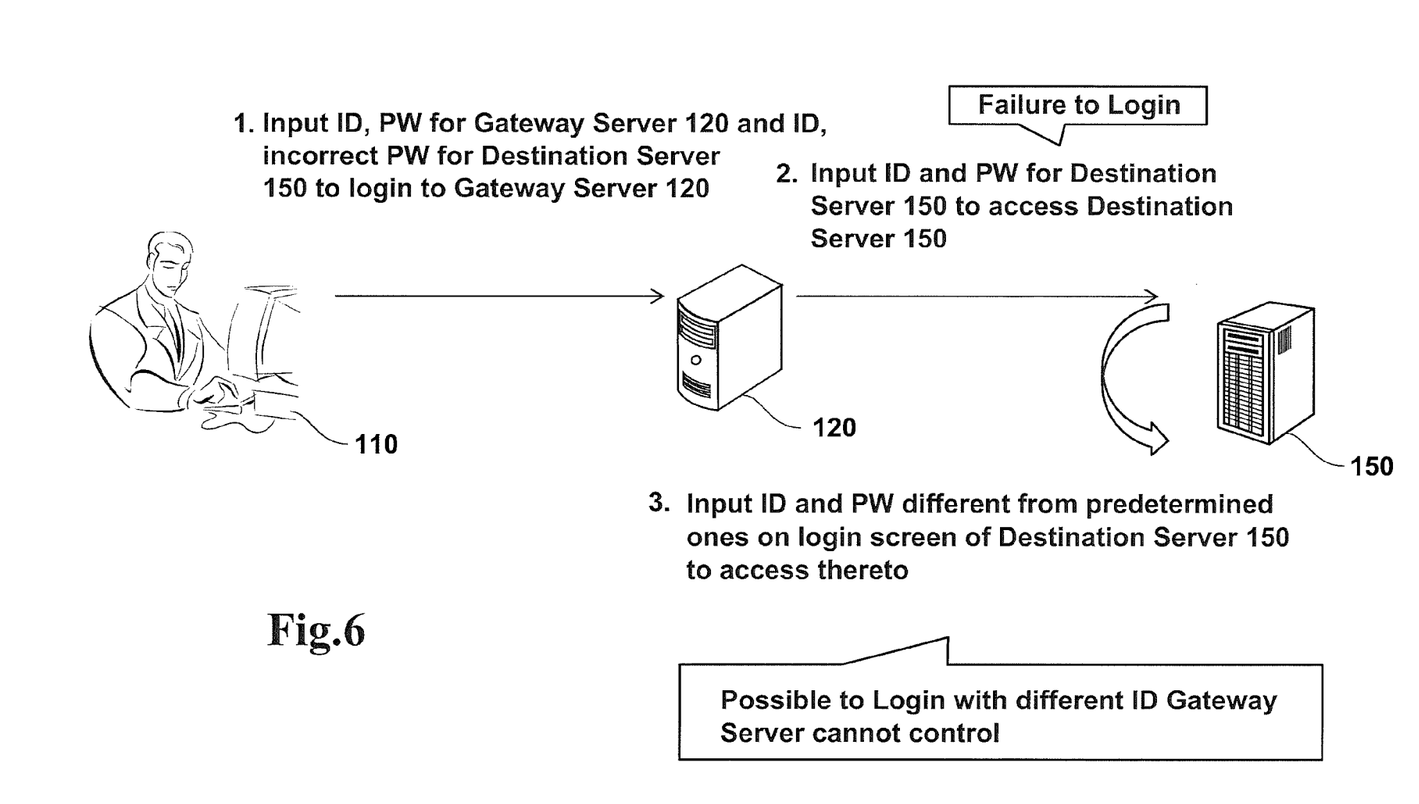
FIG. 6 is a diagram describing an example in which access management fails to be performed in the configuration example shown in FIG. 5.

FIG. 6 is a diagram describing an example in which the access management fails to be performed in the configuration example shown in FIG. 5. In the example shown in FIG. 6, a user who needs to access the destination server 150 constituting a business information system 100 inputs, to the gateway server 120, information different from that shown in FIG. 5. More specifically, the user ID and password for gateway server 120 and the user ID for the destination server 150 are same with these shown in FIG. 5 but the password corresponding to the user ID for the destination server 150 has been wrongly designated regardless of whether it is intentionally or unintentionally. Naturally, the login processing to the destination server 150 has failed in this case. However, depending on a method for accessing the destination server 150, a login screen may be displayed on the terminal used by the user who has requested the access after the user has failed to login. Therefore, it is theoretically possible to login by inputting, on the displayed login screen, a user ID different from the user ID which has input to the gateway server 120 and a password. Furthermore, when the user logins in the above described manner, the gateway server 120 cannot perform the access management of the privileged ID.

The present invention is made in consideration of the above described problems and a purpose of the present invention is to provide a relay device, a relay method and a program which appropriately perform access management.

Solution to Problem

An aspect of the present invention relates to a relay device. That is, a relay device according to the present invention is to relay connection to a requested server based on a connection request from a client terminal, comprising: an receiving unit which receives a user ID and a password for logging in to the requested server from the client terminal; a connection relay unit which relays the connection to the requested server without performing user authentication based on the user ID and the password received by the receiving unit at establishing a session with the requested server; and a confirmation unit which confirms a validity of a combination of the user ID and the password received by the receiving unit with connecting to the requested server by way of different processing from connection relay processing of the connection relay unit; wherein: the connection relay unit establishes the session with the requested server when the confirmation unit confirms that the combination of the user ID and the password received by the receiving unit is correct.

In addition to the above described configuration, the confirmation unit can confirm, by using either a predetermined protocol different from a protocol used in communication between the connection relay unit and the requested server or a protocol corresponding to a predetermined interface equipped in the requested server, the validity of the combination of the user ID and the password received by the receiving unit.

In addition to the above described configuration, the predetermined interface equipped in the requested server has a service for receiving a predetermined request along with a user ID and a password which are given a validated authority by the requested server and then providing predetermined information, and the confirmation unit transmits, to the service, a predetermined request including the user ID and the password received by the receiving unit and then, if the predetermined information is received in response from the service, determines that the combination of the user ID and the password received by the receiving unit is correct.

Another aspect of the present invention relates to a relay method. That is, a relay method according to the present invention is to relay connection to a requested server based on a connection request from a client terminal, comprising steps of: receiving a user ID and a password for logging in to the requested server from the client terminal; relaying the connection to the requested server without performing user authentication based on the user ID and the password received in the step of receiving at establishing a session with the requested server; and confirming a validity of a combination of the user ID and the password received on the step of receiving with connecting to the requested server by way of different processing from connection relay processing of the connection relay unit; connecting to the requested server by way of different processing from connection relay processing in the step of relaying the connection; wherein: in the step of relaying the connection the session with the requested server is established when it is confirmed in the step of confirming that the combination of the user ID and the password received in the step of receiving is correct.

Another aspect of the present invention relates to a computer program. That is, a computer program according to the present invention is to cause a computer to function as a relay device which relays connection to a requested server based on a connection request from a client terminal, which causes the computer to function as: receiving means for accepting a user ID and a password for logging in to the requested server from the client terminal; connection relay means for relaying the connection to the requested server without performing user authentication based on the user ID and the password received by the receiving means at establishing a session with the requested server; and confirmation means for confirming a validity of a combination of the user ID and the password received by the receiving means with connecting to the requested server by way of different processing from connection relay processing of the connection relay means; wherein: the connection relay means establishes the session with the requested server when the confirmation unit confirms that the combination of the user ID and the password which have been accepted by the receiving unit is correct.

Advantageous Effects of Invention

According to the present invention, it is possible to provide a relay device, a relay method, and a program which appropriately perform access management.

DESCRIPTION OF EMBODIMENTS

[Configuration of Business Information System]

Figure 1:
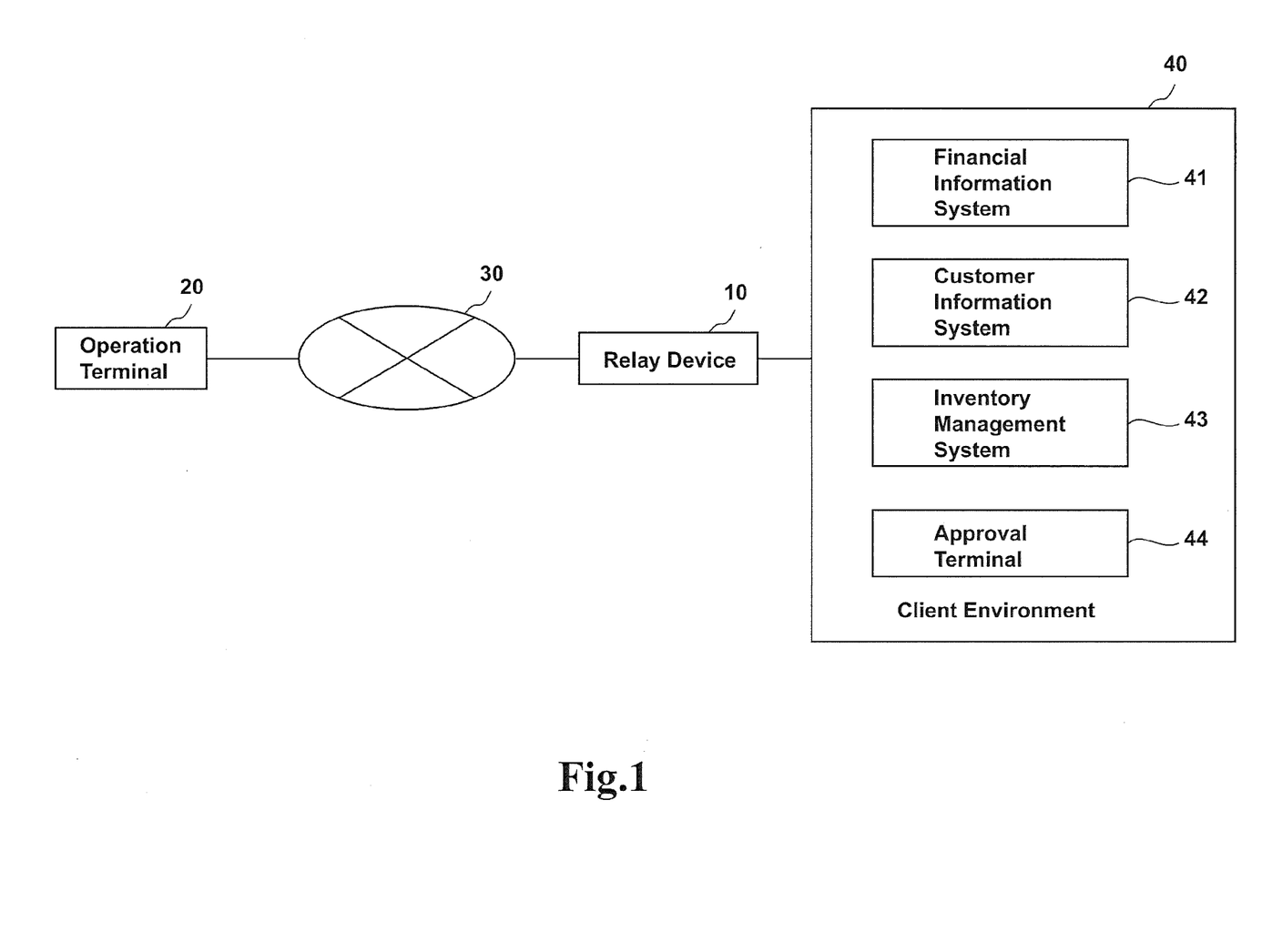
FIG. 1 is a block diagram showing a configuration example of a business information system including a relay device according to an embodiment of the present invention.

FIG. 1 is a block diagram showing a configuration example of a business information system including a relay device according to an embodiment of the present invention. In the business information system, a relay device 10 and an operation terminal 20 are connected each other via a network 30 and a client environment 40 is connected to the network 30 via the relay device 10. In the following description, it is assumed that the network 30 is remotely accessed via a public line such as the internet or a local area network (LAN). However, the relay device 10, the client environment 40, and the operation terminal 20 may be connected each other via a dedicated line. Furthermore, in this description, terms of a "client company" and the "client environment 40" are used to indicate a client which executes organizational businesses by operating various business information systems and receives a service of maintenance work from the external operation terminal 20.

In the business information system shown in FIG. 1, the client environment 40 indicates a business environment of a company X. Various business information systems of the client environment 40 properly receive maintenance work after the systems start operating. The maintenance work is performed in the client environment 40 in some cases but mainly performed by being remotely accessed from the operation terminal 20. Hereinafter, a user who performs the remote maintenance work is simply referred to as a "worker". The most of the workers are generally system engineers (SE) of a management company having an agreement with the company X on the maintenance work. The worker operates the operation terminal 20 and remotely logins to the various business information systems of the client environment 40 via the network 30 and the relay device 10. It is preferable that a communication path between the operation terminal 20 and the relay device 10 is a safe communication path such as a virtual private network (VPN).

The relay device 10 is to receive all remote login requests from the operation terminal 20 to the client environment 40 and to be placed at a network security boundary. The relay device 10 is arranged so as to perform access control of predetermined protocols, such as a telecommunication network (TELNET), a secure shell (SSH), a file transfer protocol (FTP), a hypertext transfer protocol (HTTP), a hypertext transfer protocol security (HTTPS), a remote desktop protocol (RDP), and a common internet file system (CIPS), and an audit by acquiring logs. Note that, in the following description, it is assumed that the relay device 10 uses an RDP. The RDP is an example of a protocol which relays connection to the server constituting the various business information systems installed in the client environment 40 without performing user authentication based on the user ID and the password which have been received from the operation terminal 20 at establishing a session with the server.

The relay device 10 establishes, from the operation terminal 20, a session with a connection requested destination server installed in the client environment 40, and then, makes the connection requested destination server capable of being remotely logged in to, on the conditions that positive determinations are obtained in all of the following three steps:

1. Whether the combination of the user ID and the password for the relay device 10 is appropriate or not (hereinafter, referred to as "first user authentication");
2. Whether an application for the maintenance work by the worker is submitted beforehand and the application is correctly processed or not (hereinafter, referred to as an "application determination"); and
3. Whether the combination of the user ID and the password for the connection requested destination server is appropriate or not (hereinafter, referred to as "second user authentication").

That is, the conditions to establish the session with the connection requested destination server are that the above first user authentication and the second user authentication have succeeded and that the application for the work has been submitted in the application determination.

When the user ID and the password to remotely login to the relay device 10 and the user ID and the password to remotely login to the server for various business systems constructed in the client environment 40 are input by the worker, the operation terminal 20 transmits these pieces of information as a remote login request to the relay device 10 via the network 30.

The client environment 40 includes, for example, three business information systems of a financial information system 41, a customer information system 42, and an inventory management system 43, and one or more approval terminals 44. The financial information system 41 manages the financial information of the company X. The customer information system 42 manages the customer information of the company X. The inventory management system 43 manages the products inventory of the company X. The approval terminal 44 is a common PC terminal equipped with a web browser and used to approve the application for the maintenance work, when the application has been submitted beforehand by the worker. Note that, the approval terminal 44 does not necessarily belong to the client environment 40 and may be a mobile terminal such as a laptop PC.

[Functional Configuration of Relay Device 10]

Figure 2:
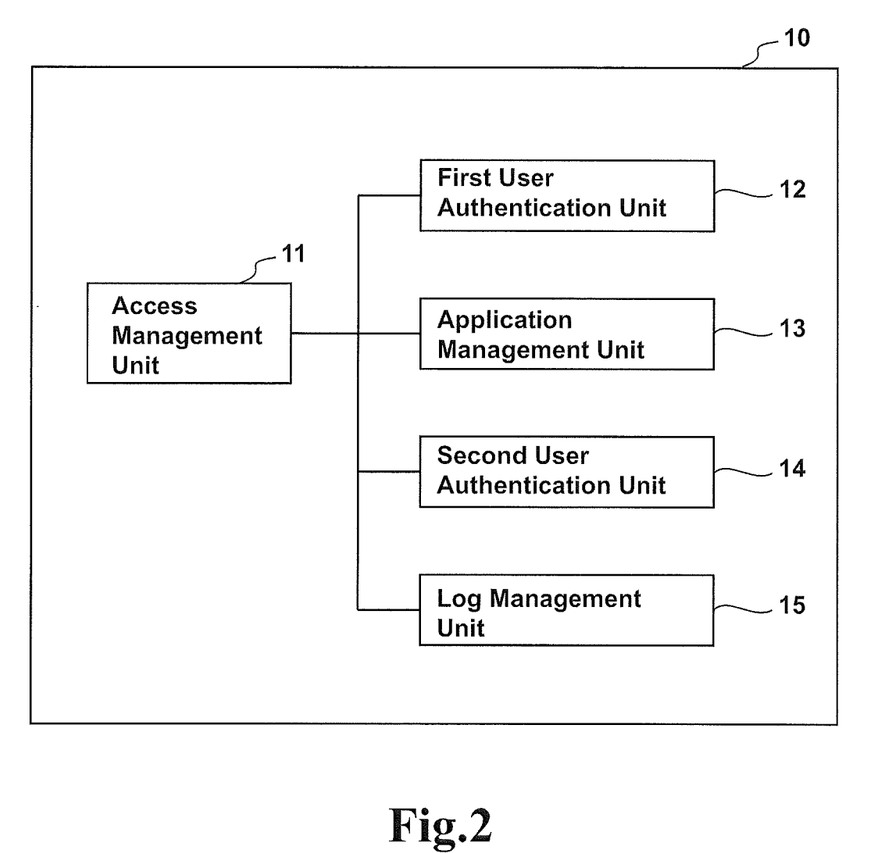
FIG. 2 is a block diagram showing a functional configuration example of a relay device 10 shown in FIG. 1.

FIG. 2 is a block diagram showing a functional configuration example of the relay device 10 shown in FIG. 1. The respective blocks shown in FIG. 2 are implemented by a processing unit (e.g., a CPU) and storage units (e.g., a RAM, a ROM, and an HDD) as hardware and by a computer program as software. However, in FIG. 2, the respective blocks show functions implemented by cooperation with them. Therefore, these functional blocks can be implemented in various ways according to the combinations of the hardware and the software.

As shown in FIG. 2, the relay device 10 includes an access management unit 11, a first user authentication unit 12, an application management unit 13, a second user authentication unit 14, and a log management unit 15. Note that, it is assumed that the relay device 10 is a single device integrally equipped with the functions of the access management unit 11, the first user authentication unit 12, the application management unit 13, the second user authentication unit 14, and the log management unit 15. However, the respective functions may be constructed by individual devices.

When receiving a connection request to a specific server of the business information system from the operation terminal 20 via the network 30, the access management unit 11 determines whether the access to the specific server is permitted or not. More specifically, the access management unit 11 confirms whether an IP address or a host name of the operation terminal 20 is a connection permission object or not with reference to a connection permission database (not shown) and immediately disconnect the access when the IP address or the host name is not the connection permission object. On the other hand, when the IP address or the host name is the connection permission object, the access management unit 11 requests a user ID and a password managed by the relay device 10 from the operation terminal 20 and receive them. Furthermore, the access management unit 11 requests a user ID and a password for the specific server and receives them. Then, the access management unit 11 provides the information, transmitted from the operation terminal 20 in response to these requests, to the first user authentication unit 12, the application management unit 13, and the second user authentication unit 14 and determines the access permission based on the response contents from the respective units. Note that, when the access permission to the specific server is determined based on the responses of the first user authentication unit 12, the application management unit 13, and the second user authentication unit 14, the access management unit 11 establishes the session with the specific server. That is, when all of the determinations of the first user authentication unit 12, the application management unit 13, and the second user authentication unit 14 are positive, the worker enables to access the business information system as the maintenance work object. Note that, after the session is established, the access management unit 11 plays a role as a proxy server which performs proxy communication between the operation terminal 20 and the specific server and records the communication log.

The first user authentication unit 12 executes first user authentication based on the information input as the user ID and the password for the relay device 10 and provided from the access management unit 11. The first user authentication unit 12 has a first user authentication database (not shown) which manages the user ID and the password for the relay device 10 and authenticates whether the user is validated or not with reference to the database. The first user authentication unit 12 returns the execution result of the first user authentication to the access management unit 11.

The application management unit 13 executes the application determination based on the information input as the user ID of the relay device 10 and received from the access management unit 11. Note that, the worker must submit the application about how and when the work is to be executed before the remote login to the specific server. The application management unit 13 has an application management database (not shown) managing whole work schedule information of the respective servers and confirms, with reference to the application management database, whether any application for the maintenance work has been submitted beforehand by the user ID indicating the worker. The application management unit 13 returns the application determination result to the access management unit 11.

The second user authentication unit 14 executes confirmation processing (the second user authentication) whether the user ID and the password for the connection requested destination are correct or not based on the information input as the user ID and the password for the connection requested destination server and provided from the access management unit 11. When receiving the user ID and the password, and the information indicating the connection requested destination (such as an IP address and a host name) from the access management unit 11, the second user authentication unit 14 confirms whether the combination of the user ID and the password for the connection requested destination is correct or not and returns the result to the access management unit 11. Note that, the details of the second user authentication will be described later.

The log management unit 15 acquires the contents of access performed in the access management unit 11 and manages them. For example, a "summary log" such as an access date/time and an IP address, and a "full-text log" of the data transmitted and received between the operation terminal 20 and the destination server are acquired and managed. Furthermore, by managing the work application contents managed by the application management unit 13 in association with the access log managed by the log management unit 15, the log management unit 15 can easily perform access check. The access check means a log audit as to whether the access is performed as the submitted application by investigating the access log.

[Example of Login Screen]

Figure 3:
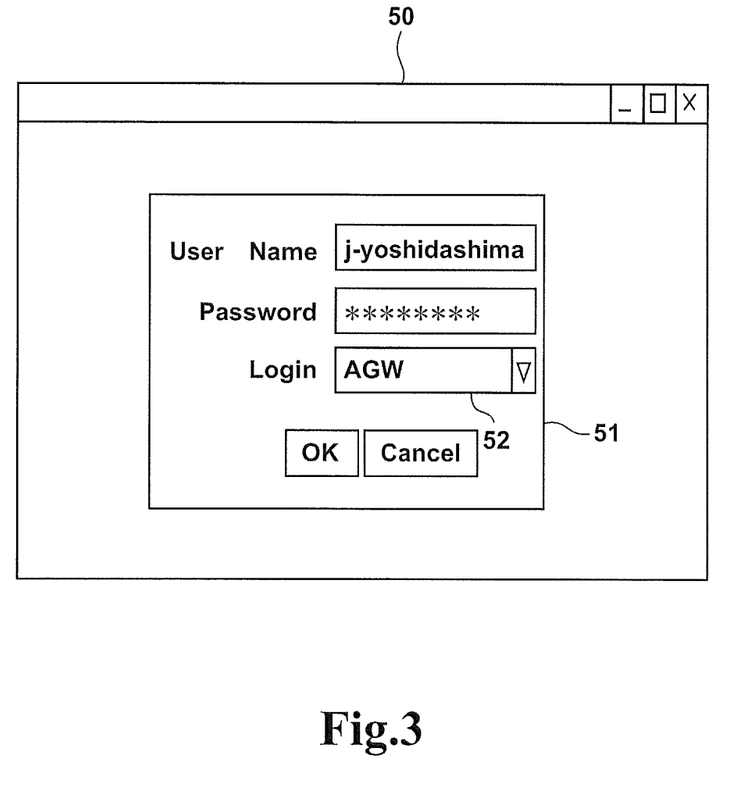
FIG. 3 is a diagram showing a display example of a login screen.

FIG. 3 is a diagram showing a display example of a login screen. A login screen 50 shown in FIG. 3 is displayed on the operation terminal 20 when a remote login request to the access management unit 11 from the operation terminal 20 is performed. When receiving the remote login request, the access management unit 11 displays a login window 51 in the login screen 50 on the operation terminal 20. That is, the access management unit 11 provides a user interface screen on the operation terminal 20. A user of the operation terminal 20 inputs a user ID and a password on the login window 51 displayed in the login screen 50. The user further designates a connection destination on a login destination selection menu window 52 which designates the connection destination. Note that, in the screen shown in FIG. 3, an "AGW" indicating the relay device 10 is designated. Although the user sees the same user interface as that provided by the conventional terminal server, the input user identification information is provided to the first user authentication unit 12, the application management unit 13, and the second user authentication unit 14, and the user authentication, the application determination, and the second user authentication are performed thereby respectively.

[Regarding Remote Login Processing]

Figure 4:
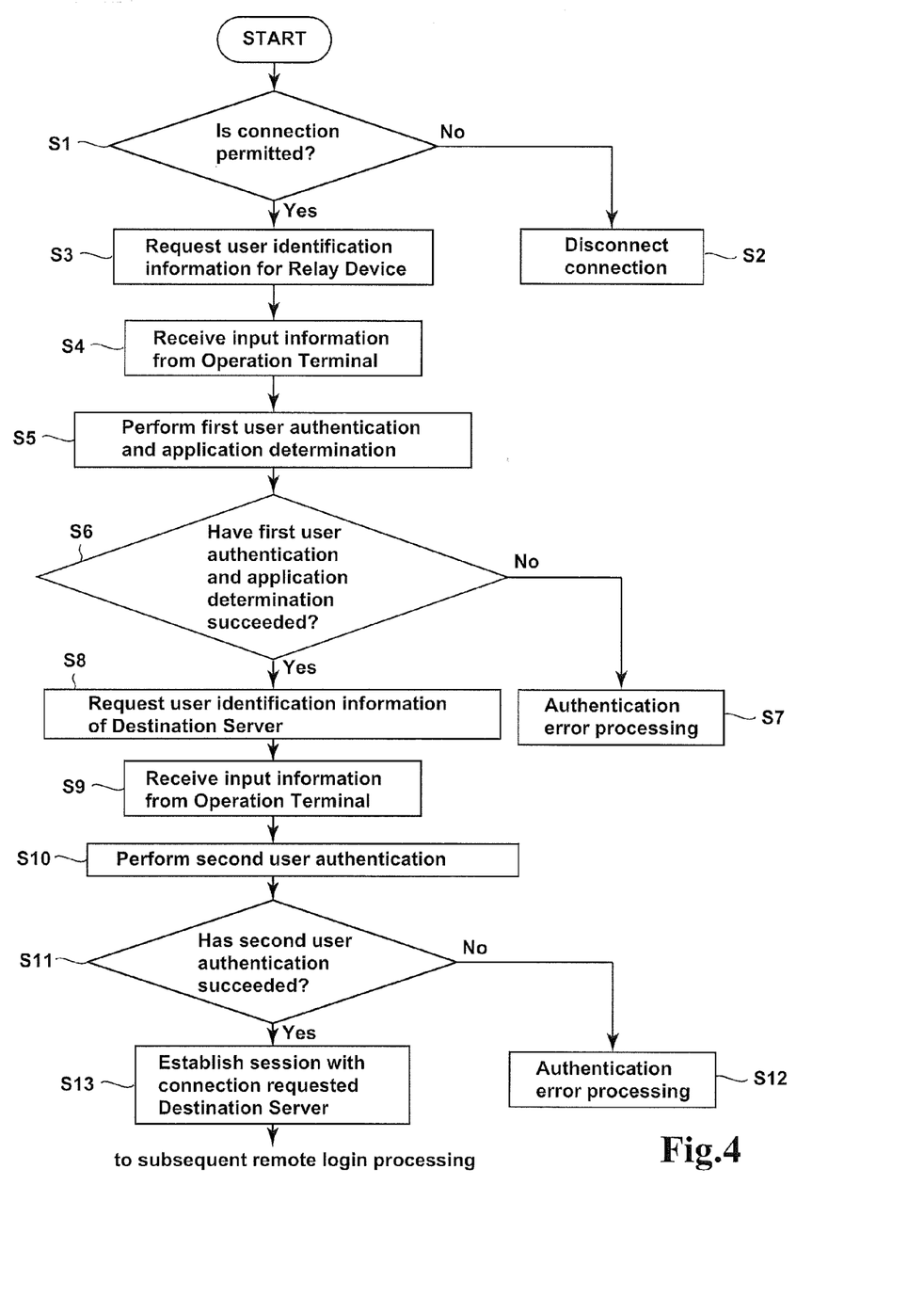
FIG. 4 is a flowchart showing remote login processing to the business information system.

Next, remote login processing to a server constituting a business information system will be described. FIG. 4 is a flowchart showing the remote login processing to a server constituting the business information system. The relay device 10 starts the following processing when receiving an access request from the operation terminal 20 (START).

Step S1: The access management unit 11 of the relay device 10 confirms an IP address and a host name of the accessing operation terminal 20 and determines whether the connection is permitted or not. More specifically, the access management unit 11 confirms whether the IP address or the host name of the operation terminal 20 is a connection permission object or not with reference to a connection permission database (not shown). Note that, the determination may be performed based on either of the IP address or the host name, or based on whether the combination of both of the IP address and the host name is correct or not.

Step S2: When determining that the connection from the operation terminal 20 is not permitted in step S1 (NO in step S1), the access management unit 11 immediately disconnects the connection. Note that, in step S2, a message indicating that the terminal cannot be connected may be displayed on the display of the operation terminal 20 without immediately disconnecting the connection.

Step S3: On the other hand, when determining that the connection from the operation terminal 20 is permitted in step S2 (YES in step S2), the access management unit 11 requests user identification information (a user ID and a password) in a form suitable for a communication protocol from the operation terminal 20. More specifically, since the communication protocol in the present embodiment is an RDP, the access management unit 11 displays the login screen 50 (FIG. 3) on the display of the operation terminal 20 and receives the input of the user ID and the password for the relay device 10 by the worker. Then, the operation terminal 20 transmits, to the access management unit 11, the information input as the user ID and the password for the relay device 10 via the login screen 50.

Step S4: The access management unit 11 receives the information input as the user identification information for the relay device 10 from the operation terminal 20. The access management unit 11 executes, by providing the information received in step S4 to the first user authentication unit 11 and the application management unit 13, first user authentication and application determination.

Step S5: The first user authentication unit 12 determines, based on the information provided from the access management unit 11 with reference to a database (not shown) holding the combination of the user ID and the password having an authority to connect to the relay device 10, whether the worker is a user having the authority to connect (in other words, performs the first user authentication). Furthermore, the application management unit 13 determines, with reference to an application management database (not shown) managing whole work schedule information of the respective servers, whether any application for maintenance work has been submitted beforehand by the provided user ID or not (in other words, performs the application determination). These determination results are returned to the access management unit 11.

Step S6: The access management unit 11 determines whether the first user authentication and the application determination in step S5 have succeeded or not. More specifically, the access management unit 11 determines whether the execution results of step S5 are positive, which means that the worker is the user having the authority to connect and any application for the maintenance work has been submitted beforehand, or not.

Step S7: When the execution results of step S5 include a negative result, which means that the worker is not the user having the authority to connect or any application for the maintenance work has not been submitted beforehand (NO in step S6), the access management unit 11 displays an authentication error message on the display of the operation terminal 20.

Step S8: On the other hand, when the execution results of step S5 are positive, which means that the worker is the user having the authority to connect and any application for the maintenance work has been submitted beforehand (YES in step S6), the access management unit 11 further requests to input the server name as a connection requested destination and user identification information (a user ID and a password) of the connection requested destination server from the operation terminal 20. Note that, the login screen to be displayed on the operation terminal 20 at this time may be a similar screen to the login screen 50 shown in FIG. 3 or a different screen. The operation terminal 20 receives the input of the connection requested destination server name, and the user ID and the password for the connection requested destination server from the worker according to the request in step S8, and transmits the input information to the access management unit 11.

Step S9: The access management unit 11 receives the input information in the operation terminal 20 in response to step S8. The access management unit 11 provides the information received in step S9 to the second user authentication unit 14.

Step S10: The second user authentication unit 14 issues a predetermined command request to the server as the connection requested destination and executes the second user authentication based on the information provided from the access management unit 11 (that is, the information indicating the connection requested destination and the information input as the user ID and the password for the connection requested destination server). The predetermined command request is issued, for example, when the server as the connection requested destination is equipped with the windows management instrumentation (WMI) interface, to a service provided by the WMI interface to notify various types of information of the server. The various types of information includes, for example, a service name executed on the server, service information such as a status, processing information such as a processing name and a used memory capacity, disc information such as a disc capacity and an available disc capacity, CPU information such as CPU utilization, OS information such as a product name and a product type, event-log information such as event contents, and memory information such as a physical memory capacity. The user ID and the password at issuing the request is executed using the information received from the access management unit 11 (that is, the information input as the user ID and the password for the connection requested destination server). Then, the second user authentication unit 14 returns the execution result to the access management unit 11.

Step S11: The access management unit 11 determines whether the second user authentication has succeeded or not based on the execution result of step S10. That is, when the requested information is correctly transmitted from the server, the access management unit 11 can confirm the validity of the user ID and the password for the connection requested destination server and thereby determine that the second user authentication has succeeded. On the other hand, when the requested information is not transmitted from the server (for example, an error message), the access management unit 11 cannot confirm the validity of the user ID and the password for the connection requested destination server and thereby determines that the second user authentication has failed.

Step S12: When determining that the second user authentication has failed in step S11 (NO in step S11), the access management unit 11 displays a user authentication error message on the display of the operation terminal 20 and does not permit to establish the session with the connection requested destination server.

Step S13: On the other hand, when determining that the second user authentication has succeeded in step S11 (YES in step S11), the access management unit 11 establishes the session with the connection requested destination server. Thus, the subsequent remote login processing continues.

With the above-described processing, the access management unit 11 establishes the session with the connection requested destination server only when all of the determinations of the first user authentication unit 12, the application management unit 13, and the second user authentication unit 14 are positive. Thus, the worker can remotely access the business information system as the maintenance work object.

Effects According to the Embodiment of the Invention

As described above, the access management unit 11 of the relay device 10 receives, from the operation terminal 20 (client terminal), a user ID and a password for logging in to any of servers (requested server) constituting the business information systems of the financial information system 41, the customer information system 42, and the inventory management system 43, according to a connection request from the operation terminal 20. Then the access management unit 11 relays the connection to the server without performing the user authentication with the user ID and the password which have been received at establishing the session with the server. Furthermore, the second user authentication unit 14 performs the connection to the server with different processing from the connection relay processing. The second user authentication unit 14 confirms the validity of the combination of the above user ID and password. Then, when the second user authentication unit 14 confirms that the combination of the user ID and the password is correct, the session with the server is established. Thus, it is impossible to login in the manner described in FIG. 6 and it is possible to realize appropriate access management of a privileged ID. More specifically, when the password for the server as the connection requested destination is wrong in performing the second user authentication by the relay device 10, the session between the relay device 10 and the connection requested destination server is not established. That is, in the case to login in the manner described in FIG. 6, the login screen to login to the connection requested destination server is not displayed on the display of the operation terminal 20.

Furthermore, the access management unit 11 of the relay device 10 confirms the validity of the combination of the received user ID and password using the WMI interface (predetermined interface) equipped in the server. Thus, the validity of the user ID and the password can be confirmed beforehand with different connection processing from the remote login processing (connection relay processing) by the relay device 10. Therefore, it is not necessary to practically login to the connection requested destination server. Furthermore, the different connection processing is not recorded in login history information of the connection requested destination server. Moreover, the relay device 10 may not hold the user ID password information managed by the connection requested destination server.

Figure 7:
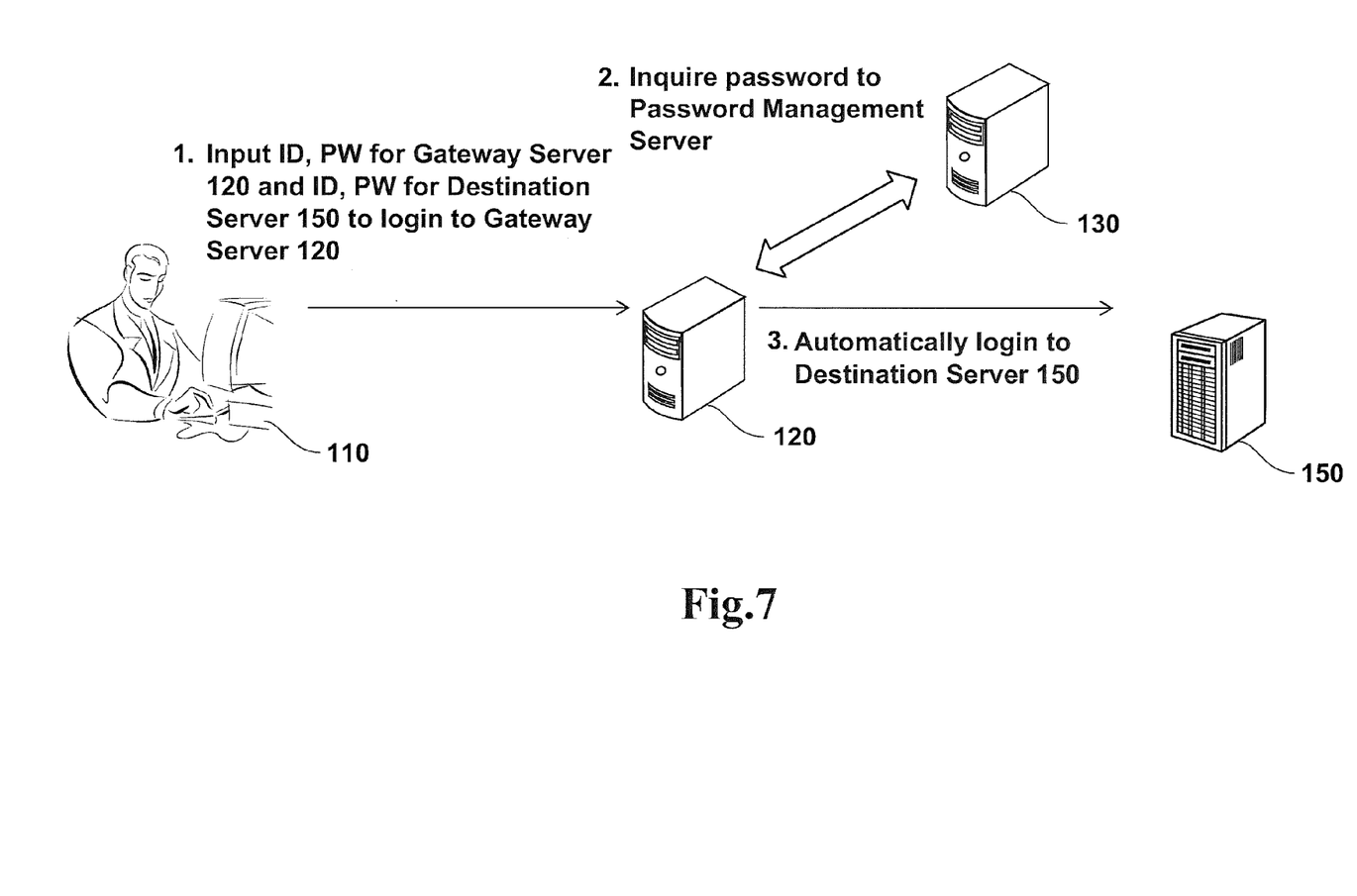
FIG. 7 is a diagram describing an example of access when the configuration example shown in FIG. 5 further includes a password management server.

It can be adopted a configuration shown in FIG. 7 as another way for solving the technical problem described above. In the configuration shown in FIG. 7, in addition to the configuration shown in FIG. 5, a password management server 130 managing a password for the destination server 150 is constructed separately from the gateway server 120. When a user ID and a password (PW) of the gateway server 120 and a user ID and a password for the destination server 150 are input from the operation terminal 20, the gateway server 120 inquiries the password corresponding to the user ID of the destination server 150 from the password management server 130 and confirms the validity of the password transmitted from the operation terminal 20. When the validity of the password transmitted from the operation terminal 20 is confirmed, the user is made automatically login to the destination server 150. However, this configuration has disadvantages in that the password management server 130 needs to be constructed separately from the gateway server 120, the workload to operate the password management increases, and the cost to construct the password management server 130 is newly incurred. On the other hand, in the configuration of the above described relay device 10, it is not necessary to construct the password management server 130 and these disadvantages do not occur.

Furthermore, when receiving a predetermined request along with a user ID and a password which are given a validated authorization by the server, the WMI interface equipped in the connection requested destination server has a service to provide predetermined information. The access management unit 11 transmits the predetermined request including the received user ID and password to the service. When the predetermined information has been acquired in response from the service, the access management unit 11 determines that the combination of the received user ID and password is correct. That is, the response from the service provided by the WMI interface equipped in the connection requested destination server is appropriately returned, which means an access right as a condition that the service is to be performed, whereby the validity of the received user ID and password can be easily confirmed. Furthermore, since the validity is confirmed using a protocol corresponding to the WMI interface equipped in the connection requested destination server, the significant setting changes in the connection requested destination server are not needed.

The above described a series of processing may be executed by hardware or software. When the series of processing is executed by software, a computer program constituting the software is installed, from a computer program recording medium, to a computer embedded in dedicated hardware, or a general-purpose personal computer which can execute various functions by installing various computer programs. That is, the relay method executed by the relay device 10 and the computer program installed in the relay device 10 has the similar effect to the relay device 10.

Modifications

The present invention is not limited to the above embodiments, and various implementations may be formed in a practical phase without departing from the scope of this invention. For example, a method to confirm a validity of a user ID and a password for a connection requested destination server exemplified in step S10 of FIG. 4 is not limited to the above example. For example, when a connection requested destination server is constructed by the Windows system and a file sharing service is executed by a common Internet file system (CIFS) protocol, a command to execute to read a specific file attribution may be issued by designating a user ID and a password for the connection requested destination server. In the response to the command issued in the manner, when the specific file attribution information is acquired, it is possible to determine that the validity of the user ID and the password for the connection requested destination is confirmed.

That is, in addition to a protocol (hereinafter, referred to as protocol A) to execute user authentication after a session between a connection requested destination server and a relay device 10 is established, when another protocol (hereinafter, referred to as protocol B) sharing the same user ID and authentication method as the protocol A exists, the user existence and the password validity are confirmed using the protocol B. Thereafter, by executing the connection of the protocol A, the relay device 10 can assure that the authentication of the protocol A is established.

In the remote login processing described in FIG. 4, the application determination is to determine whether any application for maintenance work has been submitted or not by the user ID provided from an operation terminal 20. The application determination may be arranged to request a connection requested destination server name of a worker further and to determine whether the connection requested destination server name matches the server name in an application for the maintenance work submitted beforehand or not. The first user authentication and the second user authentication may be arranged to request a user ID and a password for a relay device 10 and a user ID and a password of a connection requested destination server together to the operation terminal 20, instead of requesting them individually.

Furthermore, for example, by further transforming and embodying the constituent elements of the above described embodiments and modifications, and appropriately combining a plurality of constituent elements disclosed in the above embodiments and modifications, various inventions can be formed. For example, some constituent elements may be omitted from all the constituent elements described in the embodiments and modifications. Moreover, constituent elements in different embodiments may be appropriately combined.

REFERENCE SIGNS LIST

10 relay device
11 access management unit (an example of receiving unit and connection relay unit)
12 first user authentication unit
13 application management unit
14 second user authentication unit (an example of confirmation unit)
15 log management unit
20 operation terminal (an example of client terminal)
30 network
40 client environment
41 finance information system (an example of requested server)
42 customer information system (an example of requested server)
43 inventory management system (an example of requested server)

44 approval terminal
50 login screen
51 login window
52 login destination selection menu window

The invention claimed is:

1. A relay device configured to relay connection to a requested server based on a connection request from a client terminal, comprising:
   an access management unit configured to receive a user ID and a password for logging in to the requested server from the client terminal and configured to relay the connection between the client terminal and the requested server through a Remote Desktop Protocol (RDP); and
   an user authentication unit which is configured to access the requested server using a combination of the user ID and the password received by the access management unit by way of a protocol different from the Remote Desktop Protocol to confirm a validity of a combination of the user ID and the password; wherein
   the access management unit and the user authentication unit are functional units implemented by a CPU in the relay device; and
wherein
   the access management unit is configured to not relay any user authentication to the requested server from the client terminal but establishes a session with the requested server after the user authentication unit has confirmed the validity of the combination of the user ID and the password to relay the connection between the client terminal and the requested server, and wherein
   the access management unit is further configured to not display on a display of the client terminal any login screen for logging-in to the requested server when the password for the requested server is wrong.

2. The relay device according to claim 1, wherein: the user authentication unit confirms, by using either a predetermined protocol different from a protocol used in communication between the access management unit and the requested server or a protocol corresponding to a predetermined interface equipped in the requested server, the validity of the combination of the user ID and the password received by the access management unit.

3. The relay device according to claim 2, wherein:
   the predetermined interface equipped in the requested server has a service for receiving a predetermined request along with a user ID and a password which are given a validated authority by the requested server and then providing predetermined information, and
   the user authentication unit transmits, to the service, a predetermined request including the user ID and the password received by the access management unit and then, if the predetermined information is received in response from the service, determines that the combination of the user ID and the password received by the access management unit is correct.

4. A computer-implemented relay method for relaying connection to a requested server based on a connection request from a client terminal, comprising steps of:
   receiving a user ID and a password for logging in to the requested server from the client terminal;
   relaying the connection between the client terminal and the requested server through a Remote Desktop Protocol (RDP);
   accessing the requested server using a combination of the user ID and the password received in the step of receiving by way of a protocol different from the Remote Desktop Protocol to confirm a validity of the combination of the user ID and the password;
   wherein:
   in the step of relaying the connection any user authentication information is not relayed to the requested server from the client terminal, instead a session is established with the requested server after the validity of the combination of the user ID and the password is confirmed to relay the connection between the client terminal and the requested server, and
   wherein:
   when the password for the requested server is wrong, any login screen for logging-in to the requested server is not displayed on a display of the client terminal.

5. A non-transitory computer-readable storage medium storing a computer program causing a computer to function as a relay device which relays connection to a requested server based on a connection request from a client terminal, which causes the computer to function as:
   receiving means for accepting a user ID and a password for logging in to the requested server from the client terminal;
   connection relay means for relaying the connection between the client terminal and the requested server through a Remote Desktop Protocol; and
   confirmation means for confirming a validity of a combination of the user ID and the password received by the receiving means by way of a protocol different from the Remote Desktop Protocol,
   wherein:
   the connection relay means is configured to not relay any user authentication to the requested server from the client terminal but establishes a session with the requested server after the confirmation means has confirmed the validity of the combination of the user ID and the password to relay the connection between the client terminal and the requested server, and
   wherein
   the receiving means is further configured to not display on a display of the client terminal any login screen for logging-in to the requested server when the password for the requested server is wrong.

* * * * *